United States Patent
Takiwawa et al.

(10) Patent No.: US 6,386,329 B1
(45) Date of Patent: May 14, 2002

(54) BICYCLE BRAKE SHOE

(75) Inventors: Shinichi Takiwawa; Mitsuaki Kaneto, both of Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/593,680

(22) Filed: Jun. 14, 2000

(51) Int. Cl.$^7$ .............................................. F16D 69/02
(52) U.S. Cl. ....................... 188/24.12; 188/251; 188/17
(58) Field of Search .......................... 188/24.11, 24.12, 188/24.22, 251 R, 251 A, 251 M

(56) References Cited

U.S. PATENT DOCUMENTS

| | | | | |
|---|---|---|---|---|
| 4,189,424 A | * | 2/1980 | Takamatsu | 266/42.15 |
| 5,246,994 A | * | 9/1993 | Shibahara et al. | 524/232 |
| 5,508,354 A | * | 4/1996 | Talma et al. | 525/274 |
| 5,636,716 A | | 6/1997 | Sugimoto et al. | 188/24.22 |
| 5,860,883 A | * | 1/1999 | Jonen et al. | 474/205 |
| 5,877,327 A | * | 3/1999 | Talma et al. | 584/404 |

FOREIGN PATENT DOCUMENTS

| | | |
|---|---|---|
| EP | 0555877 | 6/1993 |
| JP | 55092 | 1/1993 |
| JP | 9290467 | 11/1997 |
| SU | 1445160 | 9/1992 |

OTHER PUBLICATIONS

"1997 Shimano Bicycle System Components Manual" Sep. 1996; pp. 86–87.

* cited by examiner

Primary Examiner—Matthew C. Graham
(74) Attorney, Agent, or Firm—Shinjyu Global IP Counselors, LLP

(57) ABSTRACT

Bicycle brake shoes are provided for a bicycle braking device. The brake shoes are pressed into contact with a bicycle wheel rim to apply a braking force thereto. The brake shoes are coupled to the bicycle braking device by brake shoe holders. Each brake shoe includes an attachment portion coupled to the brake shoe holder and a rim contacting portion for contacting the side braking surface of the rim. The brake shoes are formed from a non-sulfur cross-linked polymer such as butadiene rubber (BR) or acrylonitrile-butadiene rubber (NBR) being cross-linked with zinc methacrylic acid. In the preferred embodiment, the rim contacting portion is further formed by cross-linking the butadiene rubber or acrylonitrile-butadiene rubber with a binder such as peroxide. The brake shoe is elongated in the rotation direction of the wheel rim and has a braking surface opposite to the braked surface of the rim.

18 Claims, 5 Drawing Sheets

BICYCLE BRAKE SHOE

BACKGROUND OF THE INVENTION

1. Field of the Invention

This invention generally relates to bicycle brake shoes for bicycle braking devices. More specifically, the present invention relates bicycle brake shoes that does not excessively wear the rim while maintaining good performance in wet conditions.

2. Background Information

Bicycling is becoming an increasingly more popular form of recreation as well as a means of transportation. Moreover, bicycling has also become a very popular competitive sport. Whether the bicycle is used for recreation, transportation or competition, the bicycle industry is constantly improving their components. One particular component of bicycles that has been extensively redesigned over the past years is the operation of the brakes.

There are several types of bicycle braking devices, which are currently available on the market. Some of the most popular types of bicycle braking devices include rim brakes and caliper brakes. With respect to caliper brakes, there are mainly three types of caliper brakes: a side pull type, a center pull type and a cantilever type. In a side pull type of cantilever braking device, a pair of brake arms are pivotally connected together about a center mounting bolt which attaches to the frame of the bicycle. Each of the brake arms has a lever portion which is coupled to the brake wire such that when the rider operates the brake lever of the brake operating device, the lever portions of the brake arms are pulled together, which in turn moves the brake shoes attached to the other end of the brake arms together against the rim of the bicycle wheel. Return springs are provided for biasing the brake arm away from the bicycle wheel rim when the rider releases the brake lever. Side pull types of caliper braking devices are commonly used in road bikes.

A center pull type of caliper brake device operates similarly to the side pull type, except that the brake arms are attached to a brake arm bridge such that each brake arm is pivotally coupled at a separate pivot point on the brake arm bridge. The brake arm bridge is attached directly to the frame of the bicycle. A straddle cable interconnects the two lever portions of the brake arms such that a main brake wire, which is coupled to the straddle wire, pulls the lever portions of the brake arms together.

A cantilever type of braking device is generally mounted on bicycles designed for off-road use, such as mountain bikes (MTB) and all terrain bikes (ATB). In particular, a cantilever type brake device is designed to provide a powerful braking force. A cantilever type of brake device is equipped with a pair of brake arms, which are rotatably supported in a cantilever fashion on the front or rear fork of the bicycle frame, with the brake shoes attached midway between the ends of the brake arm. Typically, the lower portions of the brake arms are rotatably supported on the bicycle frame and the upper portions are linked to the brake cable or wire. The brake shoes are arranged opposite one another on either side of the bicycle wheel rims which is located between the brake arms. With this cantilever type of braking device, the bicycle arms rotate in a closing direction when the brake cable is pulled by the brake lever, which in turn results in the brake shoes being pressed against the rim to apply a braking force.

In each of these types of caliper braking devices, the brake shoe contacts side surfaces of the rim. It is important that the brake shoe provides good braking performance in both wet and dry conditions. Moreover, it is desirable that the brake shoe does not excessively wear the rim. Prior art bicycle brake shoes art typically molded from a rubber that is cross-linked with sulfur.

The braking surfaces of the bicycle rim can be hard and shiny surfaces that have been anodized, or the braking surface can be been ground and then polished to form a bicycle rim with softer braking surfaces. In the case of the anodized rim, the braking surfaces are hard and shiny which results in good braking performance in dry conditions, but poor braking performance in wet conditions. In the case of ground and polished braking surfaces, the conventional rubber brake shoes provide good braking performance in dry conditions, and better braking performance in wet conditions than hard and shiny braking surfaces with an anodized finish.

Attempts have been made to improve braking performance, especially in wet conditions, by manufacturing rubber brake shoes with refractory fillers. For example, rubber brake shoes have been manufactured with alumina ($AL_2O_3$). While such improved rubber brake shoes provide good wet and dry performance, such brake shoes with alumina cause too much wear of soft braking surfaces in the ground and polished types of rims. The trend in the bicycle industry is to produce more and more rims that have ground and polished braking surfaces. Since these braking surfaces are softer than the braking surfaces of the anodized rim, the alumina improved brake shoes should not be used because of the excessive amount of wear on these types of rims.

In view of the above, there exists a need for a bicycle brake shoe which overcomes the above mentioned problems in the prior art. This invention addresses this need in the prior art as well as other needs, which will become apparent to those skilled in the art from this disclosure.

SUMMARY OF THE INVENTION

One object of the present invention is to provide bicycle brake shoes that has improved braking performance in wet conditions.

Another object of the present invention is to provide bicycle brake shoes that does not excessively wear the rim during deceleration or stopping of the rim by the bicycle brake shoes braking while maintaining good performance in wet conditions.

The foregoing objects can be further attained by providing a bicycle brake shoe comprising a rim contacting portion with a braking surface formed from a non-sulfur cross-linked polymer that is cross-linked with zinc methacrylate.

The foregoing objects can be further attained by providing a bicycle brake shoe comprising a rim contacting portion with a braking surface formed from a polymer selected from the group consisting of butadiene rubber and acrylonitrile-butadiene rubber that is cross-linked with peroxide and a metal ion cross-linking.

The foregoing objects can also basically be attained by providing a bicycle brake shoe comprising a rim contacting portion with a braking surface formed from a polymer selected from the group consisting of butadiene rubber and acrylonitrile-butadiene rubber that cross-linked with zinc methacrylate. In the preferred embodiment, the rim contacting portion is further formed by cross-linking the butadiene rubber or the acrylonitrile-butadiene rubber with peroxide.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
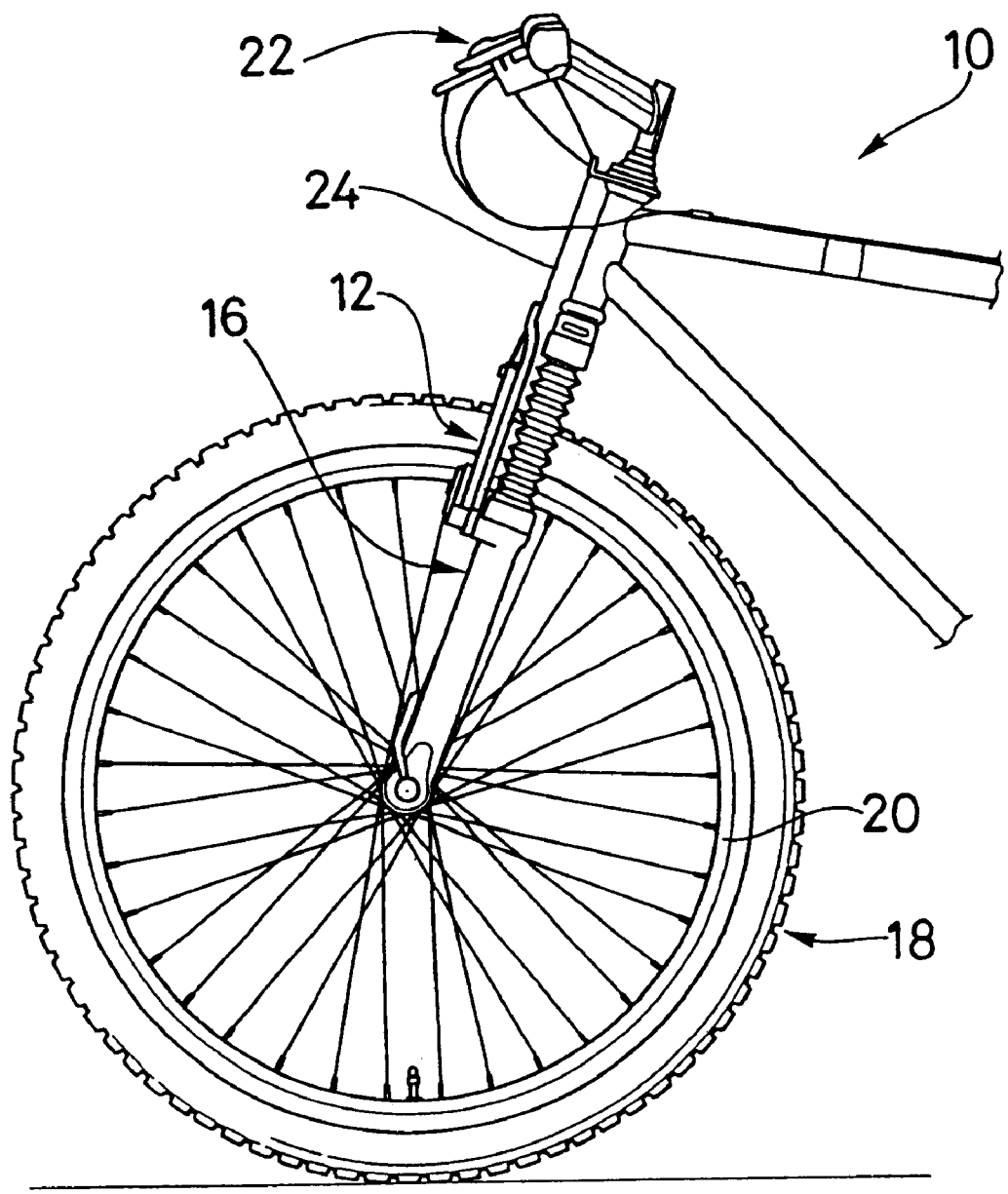
FIG. 1 is a partial, side elevational view of a conventional bicycle using a braking device with a pair of bicycle brake shoes constructed in accordance with one embodiment the present invention.
Figure 2:
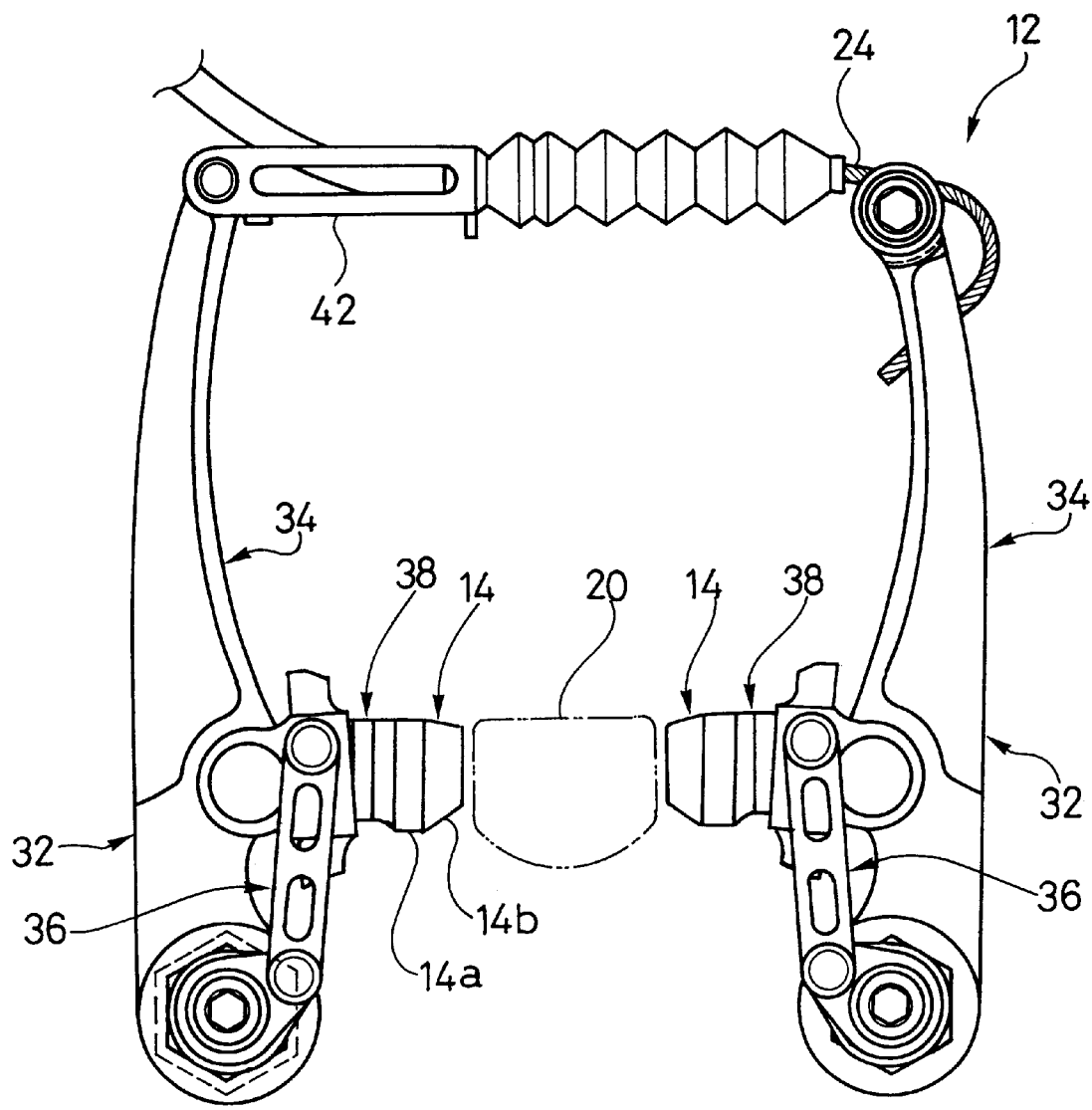
FIG. 2 is a partial front elevational view of the braking device with a pair of bicycle brake shoes constructed in accordance with the present invention.

Referring initially to FIGS. 1 and 2, a front portion of a bicycle 10 is illustrated having a bicycle braking device 12 with a pair of friction pads or brake shoes 14 according to the present invention. Bicycles and their various components are well-known in the prior art, and thus, bicycle 10 and its various components will not be discussed or illustrated in detail herein, except for the components of bicycle 10 which relate to the braking device 12 in accordance with the present invention. In other words, only bicycle braking device 12 will be discussed and illustrated in detail herein.

Figure 3:
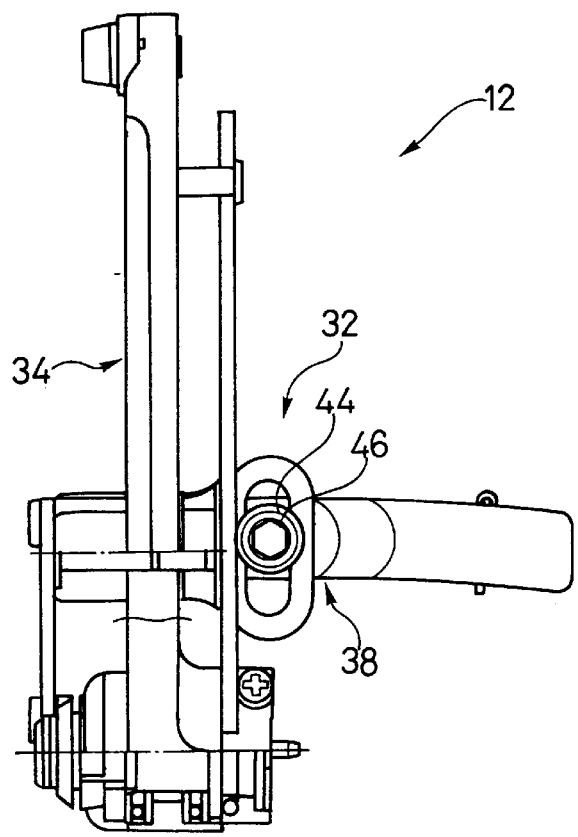
FIG. 3 is a partial side elevational view of the braking device with a pair of bicycle brake shoes illustrated in FIG. 2.

As seen in FIG. 1, the front braking device 12 is illustrated as being coupled to front fork 16 of bicycle 10 in a relatively conventional manner. Of course, it will be apparent to those skilled in the art from this disclosure that another braking device 12 is preferably coupled to the rear fork of bicycle 10 in a conventional manner. As shown in FIGS. 2 and 3, the front braking device 12 is a "cantilever type" of braking device. Of course, it will also be apparent to those skilled in the art from this disclosure that other types of bicycle braking devices that can utilize the brake shoes 14 of the present invention, as needed and/or desired.

Basically, braking device 12 is coupled to the front fork 16 of the bicycle 10 such that it can move between a release position and a brake position. In the release position, the brake shoes 14 of the braking device 12 do not engage the rim 20 so that the wheel 18 is free to rotate. In the brake position, the brake shoes 14 of the braking device 12 are pivoted such that the bicycle brake shoes 14 grip the braking surfaces of the rim 20 to decelerate or stop rotation of the wheel 18. In particular, the rider will operate the brake operating device 22 which in turn will pull cable 24 to cause the brake shoes 14 of the braking device 12 to engage the braking surfaces of the rim 20 of the wheel 18.

Since most braking devices are well known to those skilled in the art, the braking device 12 will only be briefly discussed and illustrated herein to the extent needed to understand the present invention. Basically, each braking device 12 has a pair of brake mechanisms 32 that are pivotally coupled to front fork 16. Each of the braking mechanisms 32 have a brake arm 34, a four-bar link mechanism 36, and a pair of friction pad supports or brake shoe holders 38 to which the friction pads or brake shoes 14 are secured in a conventional manner. A link 42 and one end of cable 24 interconnect the upper ends of brake arms 34 such that the brake mechanisms 32 pivot together in a conventional manner. The brake shoe holders 38 are coupled to the brake arms 34 by a center post 44 and a nut 46 that is attached to the four-bar link mechanism 36.

In operation, when the rider operates the brake lever of the brake operating device 22, the inner wire of the cable 24 is pulled within the outer casing of the cable 24 so that the upper portions of the brake arms 34 are pulled inwardly. Thereafter, the friction pads 14 on the brake shoe holders or pad supports 38 are pressed against the side surfaces of the rim 20, thus causing a braking action to be performed. Once the rider releases the brake lever of the brake operating device 22, the brake wire of the cable 24 is relaxed so that the coil springs within the brake arm cause the brake arms 34 to pivot in the opening direction. As a result, the tip ends of the friction pads or brake shoes 14 on the brake shoe holders 38 are withdrawn from the side surfaces of rim 20 so that the braking action is released.

Figure 4:
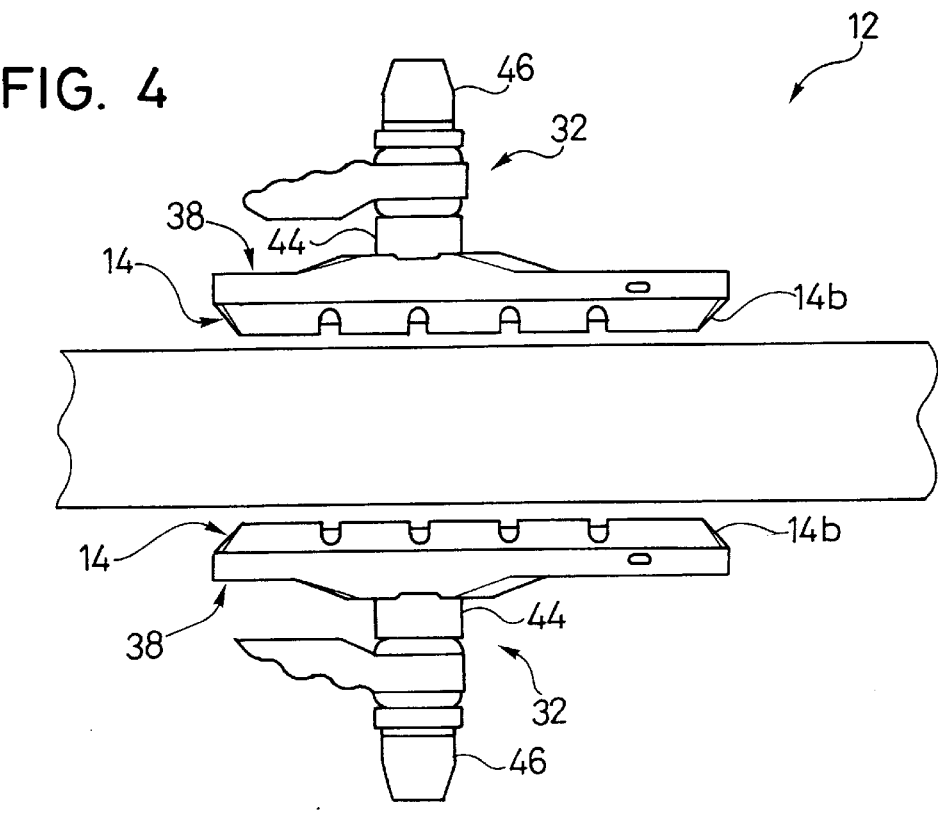
FIG. 4 is a partial top plan view of the braking device with a pair of bicycle brake shoes attached thereto as illustrated in FIGS. 2 and 3.
Figure 5:
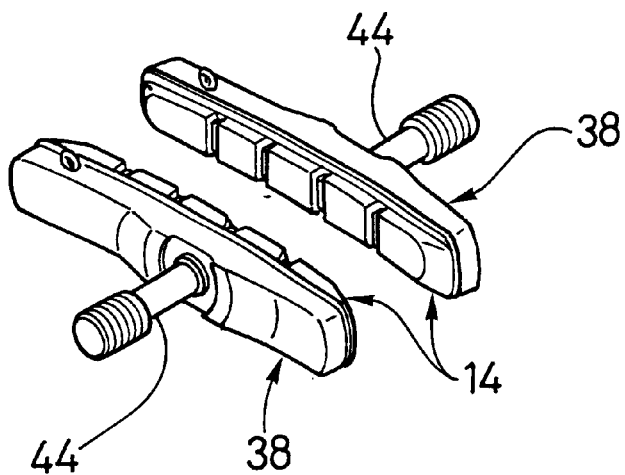
FIG. 5 is a perspective view of the pair of bicycle brake shoes with the brake holders attached thereto as illustrated in FIGS. 2–4.
Figure 6:
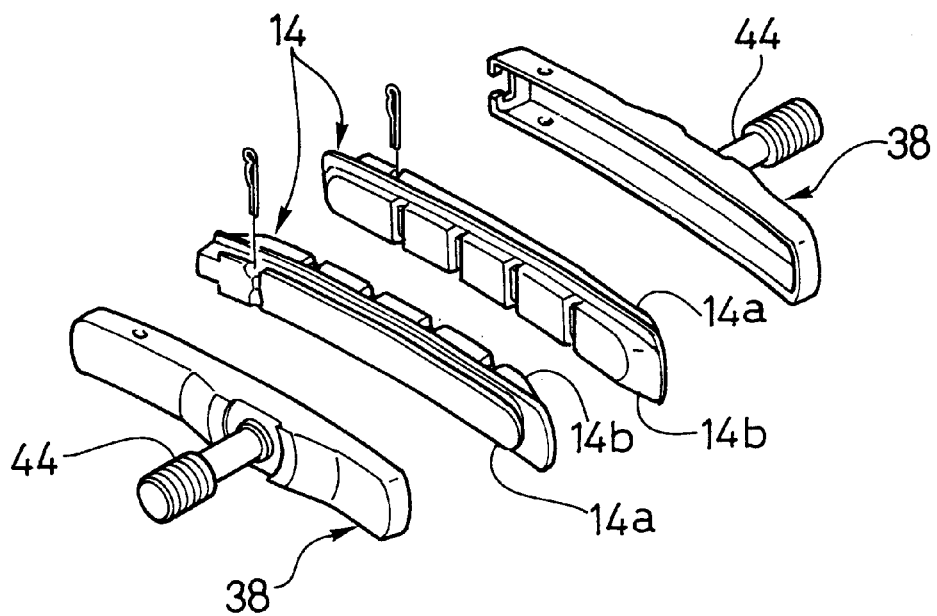
FIG. 6 is an exploded perspective view of the pair of bicycle brake shoes with the brake holders attached thereto as illustrated in FIGS. 2–5.

As best seen in FIGS. 4–6, each of the bicycle brake shoes 14 has an attachment portion 14a and a rim contacting portion 14b with a braking surface. The bicycle brake shoes 14 are formed from a non-sulfur cross-linked polymer such as butadiene rubber (BR) or acrylonitrile-butadiene rubber (NBR) being cross-linked with a metal, preferably zinc methacrylate and a binder such as peroxide. Thus, the bicycle brake shoes 14 of the present invention is vulcanized by a peroxide such as Di-Cup 40C instead of by sulfur.

In this embodiment illustrated in FIGS. 4–6, the attachment portion 14a and the rim contacting portion 14b are integrally formed as a one-piece, unitary member. Thus, both the attachment portion 14a and the rim contacting portion 14b are form of butadiene rubber or acrylonitrile-butadiene rubber cross-linked with the zinc methacrylate in this embodiment. Alternatively, the attachment portion 14a and the rim contacting portion 14b can be formed of separate pieces that are integrally attached together by adhesive or the like. Moreover, the brake shoe holders 38 can be eliminated in this embodiment by having one end of the center post 44 embedded within the attachment portion 14a.

Figure 7:
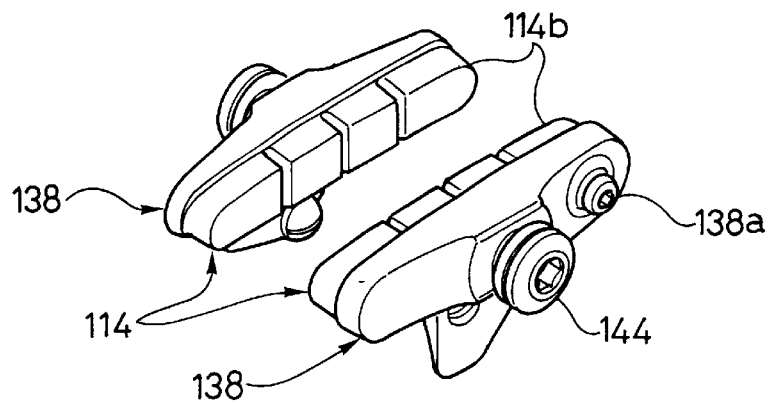
FIG. 7 is a perspective view of a pair of bicycle brake shoes with a brake holders attached thereto in accordance with another embodiment of the present invention.
Figure 8:
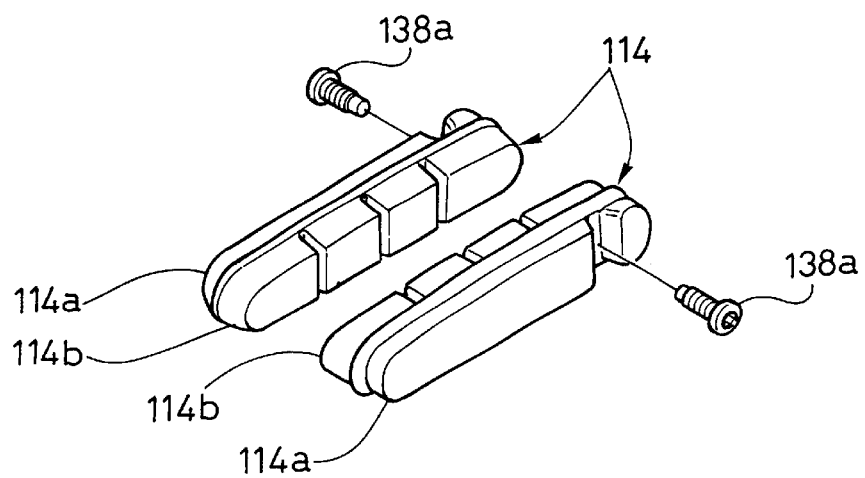
FIG. 8 is an exploded perspective view of the pair of bicycle brake shoes and the attachment screws illustrated in FIG. 7.

Referring now to FIGS. 7 and 8, bicycle brake shoes 114 and brake shoe holders 138 are illustrated in accordance with an alternative embodiment of the present invention. Specifically, the attachment portions 114a and the rim contacting portions 114b are formed of separate pieces that are integrally attached together by adhesive or the like. Thus, in this embodiment, the rim contacting portion 14b is formed from butadiene rubber or acrylonitrile-butadiene rubber being cross-linked with zinc methacrylate and peroxide, while the attachment portions 114a can be constructed of any other suitable material. Each of the attachment portions 114a is fixedly attached to one of the rim contacting portions 114b by a suitable means such as adhesive or the like. The attachment portions 114a are received in recesses of the brake shoe holders 138. Threaded fasteners or screws 138a are utilized to fixedly secure the bicycle brake shoes 114 to the brake shoe holders 138 in a relatively conventional manner.

Figure 9:
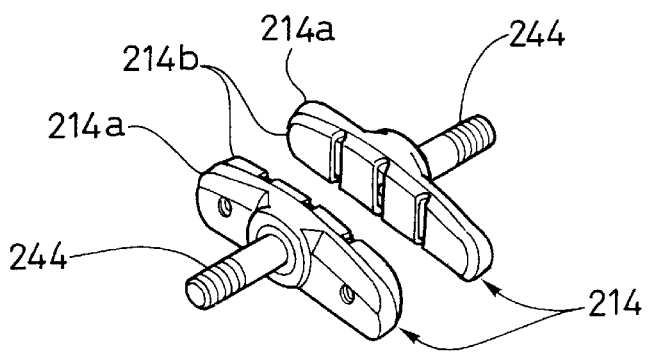
FIG. 9 is a perspective view of a pair of bicycle brake shoes with attachment posts embedded in the bicycle brake shoes in accordance with another embodiment of the present invention.

Referring now to FIG. 9, bicycle brake shoes 214 are illustrated having attachment portions 214a and rim contacting portions 214b in accordance with yet another embodiment of the present invention. In this embodiment of the present invention, the brake holders have been eliminated by using center posts 244 that are embedded in the brake shoes 214. Specifically, one end of each center post 244 is embedded within one of the attachment portions 214a during the molding process of the bicycle brake shoes 214.

In this embodiment, both the attachment portion 214a and the rim contacting portion 214b of each of the bicycle brake shoes 214 are integrally formed as a one-piece, unitary member. Thus, both the attachment portions 214a and the rim contacting portion 214b of each of the bicycle brake shoes 214 are formed of butadiene rubber or acrylonitrile-butadiene rubber cross-linked with the zinc methacrylate and the peroxide. Preferably, the center posts 244 are embedded within the attachment portions 214a during the molding process of the bicycle brake shoes 214. More specifically, the end of the center posts 244 that are embedded within the attachment portions 214a have a flange member embedded within the attachment portions 214a. It will be apparent to those skilled in the art from this disclosure that utilizing conventional molding techniques, the attachment portions 214a can be constructed of a separate material from the rim contacting portions 214b, as needed and/or desired. In other words, while only limited manufacturing techniques are disclosed herein for constructing bicycle brake shoes in accordance with the present invention, it will be apparent to those skilled in the art from this disclosure that numerous other manufacturing techniques may be utilized in constructing bicycle brake shoes in accordance with the present invention.

In the preferred embodiment of FIGS. 2–6, the attachment portion 14a and the rim contacting portion 14b are further formed by cross-linking the butadiene rubber or acrylonitrile-butadiene rubber with zinc methacrylate and a binder such as peroxide. Thus, the brake shoes 14 are formed without utilizing conventional sulfur cross-linking. The attachment portion 14a and the rim contacting portion 14b can be formed with additional materials such as, but not limited to, one or more of the following materials alumina, talc, barium sulfate, zinc bloom, stearic acid, zinc stearate, calcium stearate, and paraffin wax. Examples of some possible blends for manufacturing the bicycle brake shoes 14 in accordance with the present invention are shown below in TABLE 1. Of course, the attachment portions 114a or 214a and the rim contacting portions 114b or 214b can also be manufactured with the materials listed in the blend examples of TABLE 1. The various materials for the blends of TABLE 1 are expressed in parts by weight.

TABLE 1

| | Blend Examples | | | | | | | | |
|---|---|---|---|---|---|---|---|---|---|
| | 1 | 2 | 3 | 4 | 5 | 6 | 7 | 8 | 9 |
| Butadiene Rubber | 100 | 100 | 100 | 100 | 100 | 100 | 100 | 100 | 100 |
| Alumina | 7.5 | 7.5 | 7.5 | 7.5 | 7.5 | 0 | 0 | 0 | 7.5 |
| Zinc Methacrylate | 25 | 25 | 20 | 15 | 10 | 15 | 25 | 25 | 25 |
| Talc | 190 | 220 | 220 | 220 | 220 | 220 | 220 | 0 | 0 |
| Barium Sulfate | 0 | 0 | 0 | 0 | 0 | 0 | 0 | 440 | 440 |
| Zinc Bloom | 20 | 20 | 20 | 20 | 10 | 20 | 20 | 20 | 20 |
| Stearic Acid | 15 | 15 | 15 | 15 | 15 | 15 | 15 | 15 | 15 |
| Zinc Stearate | 15 | 15 | 15 | 15 | 15 | 15 | 15 | 15 | 15 |
| Calcium Stearate | 10 | 10 | 10 | 10 | 10 | 10 | 10 | 10 | 10 |
| Paraffin Wax | 10 | 10 | 10 | 10 | 10 | 10 | 10 | 10 | 10 |
| Di-Cup 40C | 1.5 | 1.5 | 1.5 | 1.5 | 1.5 | 1.5 | 1.5 | 1.5 | 1.5 |
| Total | 394.0 | 424.0 | 419.0 | 414.0 | 399.0 | 406.5 | 416.5 | 636.5 | 644 |

In manufacturing the bicycle brake shoes 14, the various materials to be blended are first measured by weight to the appropriate weight percentage and then mixed together. Next, the mixture is processed in a conventional manner to form an extruded sheet of rubber. The sheet of rubber is than cut into individual sheets that are used in a conventional molding process to form a plurality of bicycle brake shoes 14 with rim contacting portions 14b composed of the rubber compound, as mentioned above. During the molding process, the attachment portion 14a and the rim contacting portion 14b are preferably integrally formed as a one-piece, unitary member. Alternatively, the attachment portion 14a can be formed of separate piece that is integrally attached to the rim contacting portion 14b by adhesive or the like after molding the rim contacting portion 14b as mentioned above. Moreover, one end of the center post 44 can be embedded within the attachment portion 14a and/or the rim contacting portion 14b during the molding process mentioned above.

The bicycle brake shoes 14 of the present invention have been manufactured and compared to prior art bicycle brake shoes (sulfur cross-linking) as seen in the TABLE 2 below. In particular, a comparison of the wet braking distance (m) and the amount of rim wear (assessed on a scale of 1–5 with 5 being the best, i.e., the less amount of wear) is illustrated between test samples of the bicycle brake shoes 14 of the present invention and test samples of the prior art bicycle brake shoes in TABLE 2 below.

TABLE 2

| | Test Examples | | | | | | | |
|---|---|---|---|---|---|---|---|---|
| | PRIOR ART | | | PRESENT INVENTION | | | | |
| Product | 1 | 2 | 3 | 1 | 2 | 3 | 4 | 5 |
| Cross-linking Configuration | Sulfur | Sulfur | Sulfur | PO | PO | PO | PO | PO |
| Polymer | BR | BR | NBR | BR | BR | BR | BR | BR |
| Amount of Alumina (Refractory Filler) | 30 | 80 | 0 | 0 | 0 | 10 | 10 | 10 |
| Carbon Black | yes | yes | yes | no | no | no | no | no |
| Amount of Sulfur | 12 | 12 | 8 | 0 | 0 | 0 | 0 | 0 |
| Zinc Methacrylate | 0 | 0 | 0 | 15 | 25 | 25 | 20 | 15 |
| Di-Cup 40C (Peroxide) | 0 | 0 | 0 | 1.5 | 1.5 | 1.5 | 1.5 | 1.5 |
| Wet Braking Distance (m) | 5.0 | 4.3 | 8.4 | 5.0 | 4.9 | 5.1 | 4.4 | 4.6 |
| Rim Wear (Assessed on 5 Ranks) | 3 | 1 | 5 | 5 | 5 | 3 | 4 | 4 |
| Tensile Strength | 123 | no data | 75 | 103 | 139 | 136 | 119 | 109 |

As seen in TABLE 2, Examples 1 and 2 of the present invention are composed of the materials listed in Blend Examples 6 and 7, respectively, of TABLE 1. The Test Examples 1–5 of the present invention are all composed of butadiene rubber being cross-linked with peroxide (PO) and zinc methacrylate. The Test Examples 1–3 of the prior art on the other hand, all utilize sulfur for cross-linking the rubber. In the prior art Test Examples 1 and 2, the addition of alumina (refractory filler) substantially improves the wet braking distance but substantially increases the amount of rim wear. The prior art Test Example 3 illustrates a bicycle brake shoe in which no refractory filler is utilized.

The braking distances for bicycle brake shoes 14 of Test Examples 1–5 of the present invention in wet conditions are substantially equal to the braking distances for the prior art bicycle brake shoes (Examples 1 and 2 of the prior art) that use alumina as a refractory filler and substantially better than the prior art bicycle brake shoes (Example 3 of the prior art) that do not use a refractory filler such as alumina. However, the amount of rim wear for bicycle brake shoes 14 of Test Examples 1–5 of the present invention is substantially reduced as compared to prior art bicycle brake shoes (Examples 1 and 2 of the prior art), where a substantial amount of alumina is used. In prior art test Example 3, the wet braking distance is very poor, while very little rim wear occurs. Accordingly, increasing the amount of refractory filler improves the wet braking distance but also increases rim wear. Thus, it is desirable in accordance with the present invention to limit or eliminate the amount of refractory filler in the brake shoe. Of course, as seen in Test Examples 3, 4 and 5 of the present invention, a small amount of alumina (refractory filler) can be utilized without causing an excessive additional rim wear.

The terms of degree such as "substantially", "about" and "approximately" as used herein mean a reasonable amount of deviation of the modified term such that the end result is not significantly changed. These terms should be construed as including a deviation of ±25% of the modified term if this would not negate the meaning of the word it modifies. For example, "substantially perpendicular" as used herein may include two axes or two planes that deviate by plus or minus ten degrees from ninety degrees, but would not include 20°.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents.

What is claimed is:

1. A bicycle brake shoe comprising:
   an attachment portion; and
   a rim contacting portion fixedly coupled said attachment portion, said rim contacting portion having a braking surface formed from a polymer selected from the group consisting of butadiene rubber and acrylonitrile-butadiene rubber, said polymer being cross-linked with zinc methacrylate and peroxide, said rim contacting portion further being formed with at least one of stearic acid, zinc stearate, calcium stearate, alumina, paraffin wax and barium sulfate.

2. A bicycle brake shoe according to claim 1, further comprising
   a shoe holder removably coupled thereto said attachment portion.

3. A bicycle brake shoe according to claim 1, wherein said rim contacting portion is further formed with stearic acid.

4. A bicycle brake shoe according to claim 1, wherein said rim contacting portion is further formed with zinc stearate.

5. A bicycle brake shoe according to claim 1, wherein said rim contacting portion is further formed with calcium stearate.

6. A bicycle brake shoe according to claim 1, wherein said rim contacting portion is further formed with alumina.

7. A bicycle brake shoe according to claim 1, wherein said rim contacting portion is further formed of paraffin wax.

8. A bicycle brake shoe according to claim 1, wherein said rim contacting portion is further formed with barium sulfate.

9. A bicycle brake shoe according to claim 1, wherein said attachment portion and said rim contacting portion are separate pieces that are integrally attached together.

10. A bicycle brake shoe according to claim 1, wherein said attachment portion and said rim contacting portion are integrally formed as a one-piece, unitary member from said polymer cross-linked with said zinc methacrylate.

11. A bicycle brake shoe according to claim 1, wherein said attachment portion has a fastening member with one end of said fastening member being embedded within said attachment portion.

12. A bicycle brake shoe according to claim 11, wherein said attachment portion and said rim contacting portion are integrally formed as a one-piece, unitary member from said polymer cross-linked with said zinc methacrylate.

13. A bicycle brake shoe comprising:

an attachment portion; and a rim contacting portion fixedly coupled said attachment portion, said rim contacting portion having a braking surface formed from a polymer selected from the group consisting of butadiene rubber and acrylonitrile-butadiene rubber, said polymer being cross-linked with peroxide and a metal ion cross-linking, said rim contacting portion further being formed with at least one of stearic acid, zinc stearate, calcium stearate, alumina, paraffin wax and barium sulfate.

14. A bicycle brake shoe according to claim 13, wherein said attachment portion and said rim contacting portion are integrally formed as a one-piece, unitary member from said polymer.

15. A bicycle brake shoe according to claim 13, wherein said attachment portion has a fastening member with one end of said fastening member being embedded within said attachment portion.

16. A bicycle brake shoe according to claim 15, wherein said attachment portion and said rim contacting portion are integrally formed as a one-piece, unitary member from said polymer.

17. A bicycle brake shoe according to claim 13, wherein said attachment portion and said rim contacting portion are separate pieces that are integrally attached together.

18. A bicycle brake shoe comprising:

an attachment portion; and a rim contacting portion fixedly coupled said attachment portion, said rim contacting portion having a braking surface formed from a non-sulfur cross-linked polymer, said polymer being cross-linked with peroxide and zinc methacrylate, said rim contacting portion further being formed with at least one of stearic acid, zinc stearate, calcium stearate, alumina, paraffin wax and barium sulfate.

* * * * *